3,467,671
ETHYLENE SULFIDE PREPARATION
Alexander D. B. Sloan, Edinburgh, Scotland, assignor to Shell Oil Company, New York, N.Y., a corporation of Delaware
No Drawing. Filed Sept. 15, 1965, Ser. No. 487,569
Claims priority, application Great Britain Sept. 18, 1964, 38,274/64
Int. Cl. C07d 61/00
U.S. Cl. 260—327                                                    1 Claim

ABSTRACT OF THE DISCLOSURE

Alkylene sulphides, useful as precursors of polymers and copolymers, are produced by dehydration of mercapto-alkanols in the presence of certain acidic bisulphate materials under conditions whereby the alkylene sulphide is continuously removed from the dehydration reaction zone.

---

The present invention is concerned with a process for preparing an alkylene sulphide (the term "alkylene sulphide" including a substituted alkylene sulphide) by dehydration of a mercapto-alkanol containing in its molecular structure a mercapto group (SH) in the beta (2) position with respect to an alpha (1) hydroxyl group: the present invention is also concerned with the resulting alkylene sulphides.

The simple alkylene sulphides, e.g. ethylene sulphide and propylene sulphide, are of importance e.g. as starting materials for the production of polymers and copolymers; whilst the various substituted alkylene sulphides, e.g. 3-mercapto-propylene sulphide, are also of potential interest as chemical intermediates in the manufacture of a wide range of chemical and polymer products.

U.S. specification 2,436,233 discloses that one can prepare a particular substituted alkylene sulphide, namely dithioglycidol (i.e. 3-mercapto-propylene sulphide), by dehydration of 1,2-dithioglycerol (i.e. 2,3-dimercapto-propanol) by heating it, if desired in the presence of mineral acids. The applicant has not been able to obtain 3-mercapto-propylene sulphide in this way by heat alone, although when using a common mineral acid (sulphuric acid) to accelerate dehydration in the manner suggested, but not exemplified, in U.S. 2,436,233, 3-mercapto-propylene sulphide was obtained, though in rather poor yield.

As far as the applicant is aware no method of manufacturing the simple (i.e. unsubstituted) alkylene sulphides by such a dehydration route has been proposed and he considers this to be due to the known tendency of such alkylene sulphides, particularly ethylene sulphide, to polymerise extremely readily, even explosively, to solid polymers of no particular use per se. Such polymerisation is known to be catalysed by even very small amounts of acids and it would therefore appear pointless to endeavour to prepare such simple alkylene sulphides by a dehydration process in which an acid is present as a dehydration accelerator. In this respect the applicant has found it is not possible to apply the teachings in U.S. 2,436,233 to the preparation of the simple alkylene sulphides. He has found that the method employing acid catalysts suggested in U.S. 2,436,233, namely mineral acids; gaseous hydrogen halides; zinc chloride; and ferric chloride, when used in the obvious manner, i.e. as added catalysts in the reaction mixture, is quite unsuitable because such catalysts either evolve, under the reaction conditions described, acid vapours and/or decomposition products such as oxides of nitrogen or sulphur (from nitric acid and sulphuric acid respectively), or are hydrolysed under dehydration conditions by the water produced as a by-product of the dehydration to give such acid vapours and/or decomposition products. It has become apparent to the applicant that only very small amounts of such acid vapours or decomposition products are needed to cause such rapid polymerisation of a simple alkylene sulphide such as ethylene sulphide as to render the process suggested in U.S. 2,436,233 completely inoperative for the simple alkylene sulphides and, in general, capable at best of only poor yields of the substituted alkylene sulphides such as mercapto-alkylene sulphides.

The applicant has now found, in accordance with the present invention, that, surprisingly, it is possible to prepare a simple alkylene sulphide, and in general an alkylene sulphide (as herein defined), by acid catalysed dehydration at elevated temperatures providing one observes the important requirement of removing the alkylene sulphide product from the acid-containing reaction zone as quickly as possible after its formation and to remove it from said reaction zone in a form in which its environment is non-acidic; that is to say one must avoid, as far as is practicable, contacting the alkylene sulphide product either with acid or with any decomposition product of such acid which will accelerate polymerisation of the alkylene sulphide.

According to the present invention a process for preparing an alkylene sulphide comprises heating a mercapto-alkanol (as herein defined) under dehydration conditions in a reaction zone comprising an acid dehydration catalyst, continuously removing alkylene sulphide product from said zone as a vapour phase which comprises said alkylene sulphide but is substantially free from said acid catalyst or any decomposition product thereof or other substance capable of catalysing the polymerisation of said alkylene sulphide and recovering alkylene sulphide from said vapour phase.

In carrying out the present invention the nature of the acid catalyst and the conditions under which dehydration and subsequent product removal are effected should therefore be such that the vapour phase comprising said alkylene sulphide product and, in the absence of a water-binding agent in the reaction zone or the use of some other expedient for removing by-product water separately therefrom, also comprising water does not contain any volatile acid e.g. hydrogen halide or any decomposition product of the acid dehydration catalyst e.g. sulphur oxides or nitrogen oxides which would also catalyse the polymerisation of the alkylene sulphide. Such a requirement can be met by employing an acid dehydration catalyst which, at the dehydration temperature employed, is non-volatile and does not decompose to give any volatile decomposition product capable of catalysing the polymerisation of said alkylene sulphide. Such an acid catalyst can be an inorganic acid salt which usually will be substantially insoluble in the reaction mixture comprising the mercapto-alkanol in said reaction zone, although the use of other acidic substances (including free acids where appropriate) or substances capable of acting as acid dehydration catalysts in the process of the present invention, for example a sulphonated synthetic resin e.g. sulphonated cross-linked polystyrene or an acidic substance (or a substance rendered acidic by an acid treatment) such for example as an acid clay, alumina, silica gel or siliceous earth, are not excluded, provided any such acid salt, acidic substance or other substance used is of a nature which meets the requirement referred to above. Preferred acid salts are the alkali metal, particularly sodium and potassium, bisulphates: but other acid salts of inorganic acids having at least two replaceable hydrogen atoms in the molecule, e.g. phosphoric acid, are not excluded. Organic acids (other than carboxylic acids) e.g. sulphonic acids which meet the above requirement e.g. p-toluene sulphonic acid and benzene sulphonic acid can also be mentioned.

The acid dehydration catalyst can be present in the reaction zone as a heated solid (or molten) mass with which said mercapto-alkanol is contacted or, in the case of a substantially insoluble solid catalyst, as a suspension in an inert liquid medium in which said mercapto-alkanol is soluble or with which said mercapto-alkanol is miscible, said liquid medium being substantially immiscible with water. If desired said acid catalyst can be supported on or by a surface, which can be either a massive or a particulate inert support, and in such case it is preferable to provide for the minimum contact of said mercapto-alkanol with said catalyst which is necessary to effect dehydration, e.g. by passing said mercapto-alkanol as a thin film over the heated catalyst.

As an aid to removing the alkylene sulphide product in the required vapour phase the reaction zone can be swept with an inert gas or vapour e.g. nitrogen; and preferably what is referred to herein as an "entrainer" is employed for this purpose. Such an entrainer consists of or comprises a substance e.g. a hydrocarbon in which said alkylene sulphide is soluble and which also is water-immiscible and is vapourised under the dehydration conditions employed. Preferred entrainers are hydrocarbons boiling (at normal pressure) up to 80° C., for example propane, butane, pentane, hexane (or technical mixtures of such alkanes), benzene or toluene; but higher boiling hydrocarbons (or mixtures thereof e.g. petroleum distillates) which will vapourise under the dehydration conditions employed can be used and in the case of the higher boiling entrainers these can also be employed, where appropriate, as the above-mentioned liquid medium in which the catalyst is dispersed. In carrying out the present process with the aid of an entrainer as a continuous operation the entrainer is fed continuously or as required to the reaction zone at a rate appropriate to its function as an entrainer for the vapour phase and, where applicable, to maintain the required catalyst dispersion in the reaction zone. In the case of the higher boiling entrainers for example, these can be preheated, if desired, before being fed to the reaction zone.

Preferably, and essentially in the case of a relatively low boiling and polymerisation sensitive alkylene sulphide such as ethylene sulphide, the alkylene sulphide product is recovered from said vapour phase by condensation in a low temperature zone. Advantageously said zone comprises a liquid solvent, e.g. toluene, for said alkylene sulphide so that said alkylene sulphide condenses to form a solution therein. In the case of ethylene sulphide for example the product can be stored, at a low temperature, in such solution until required for use as a chemical intermediate or for manufacturing a polymeric material. The temperature at which said zone is maintained will be determined by the boiling point of the particular alkylene sulphide produced and its temperature sensitivity to polymerisation and/or decomposition. Advantageously the water produced as a by-product in the dehydration reaction is continuously removed from the reaction zone in said vapour phase and, when the boiling point of the alkylene sulphide product is low enough, is then removed from said vapour phase by passing the total vapour removed from said reaction zone through a water removal zone from which a substantially or at least mainly water-free vapour phase comprising said alkylene sulphdie is withdrawn for recovery of alkylene sulphide therefrom. It will be appreciated, in view of the requirement previously mentioned, that care should be taken to ensure that the vapour removed from said reaction zone does not carry with it any entrained acid catalyst or other substance from the reaction mixture capable of catalysing the polymerisation of said alkylene sulphide. To this end the reaction zone may for example be provided with suitable baffles to prevent carry over of such catalyst or other substance in the vapour phase.

The mercapto-alkanols which can be used for the preparation of alkylene sulphides in accordance with the present invention are defined as those mono- and poly-mercapto-alkanols which contain in their molecular structures a hydroxyl group and a mercapto group in the beta position with respect to the hydroxyl group, the term "alkanol" signifying an aliphatic or cyclo-aliphatic hydroxy compound. Said hydroxyl group and said mercapto group are therefore attached to different carbon atoms of the mercapto-alkanol molecule, and the remaining valencies of these and any other carbon atom therein can be satisfied by hydrogen atoms, hydrocarbon or substituted-hydrocarbon radicals e.g. alkyl or substituted alkyl groups or, in the case of polymercapto-alkanols, by one or more additional mercapto groups. The possibility of using mercapto-alkanols having in the molecule more than one hydroxyl group is also not excluded since, for example, this permits the preparation of diene disulphides from mercapto-alkanols having in the molecule a mercapto group beta to each of two hydroxyl groups. Desirable starting mercapto-alkanols are those having from about two to about six carbon atoms.

The present invention is particularly, though not exclusively, applicable to the preparation of the lower alkylene sulphides including ethylene sulphide, propylene sulphide, 1,2-epithiobutane (1-butylene sulphide), cis or trans 2,3-epithiobutane (2-butylene sulphide), 1,2-epithio-2-methylpropane (isobutylene sulphide) and cyclohexene sulphide from 2-mercaptoethanol, 2-hydroxypropanethiol (1-mercaptopropan-2-ol) or 2-mercaptopropanol, 2-hydroxybutanethiol (1-mercaptobutan-2-ol) or 2-mercaptobutanol, 3-mercaptobutan-2-ol (in either of its two dl forms), 2-mercapto-2-methylpropanol or 1-mercapto-2-methylpropan-2-ol, and trans- or cis-2-mercaptocyclohexanol, respectively; to the preparation of the lower di-1,2-episulphides including the meso- and dl-isomers of butadiene disulphide from the meso- and dl-isomers, respectively, of 1,4-dimercaptobutan-2,3-diol or 2,3-dimercaptobutan-1,4-diol; and to the preparation of the lower mercaptoalkylene sulphides including 3-mercaptopropylene sulphide from 2,3-dimercaptopropanol or 1,3-dimercaptopropan-2-ol, 1,2-epithio-3-mercaptobutane (3-mercaptobut-1-ene sulphide) from 2,3-dimercaptobutan-1-ol, and 1,2-epithio-3-mercaptobutane and 2,3-epithiobutanethiol (1-mercaptobut-2-ene sulphide) from 1,3-dimercaptobutan-2-ol.

It will be understood that the mercapto-alkanol starting materials and the acid dehydration catalysts employed will vary in their activities in the dehydration reaction and that some will require (or will tolerate without subsequent decomposition of the alkylene sulphide product) somewhat higher dehydration temperatures than others; but in general elevated temperatures at least equal to the boiling point of the alkylene sulphide under the dehydration conditions employed and preferably temperatures above 100° C., advantageously above 125° C., for example 130 to 150° C., are suitable temperatures for carrying out the process of the present invention. If desired the dehydration reaction can be effected under pressure or at atmospheric pressure, but usually it is preferable to effect the dehydration reaction at reduced pressure. In general the advantageous reaction temperature and pressure will depend on the nature of the mercapto-alkanol starting material and the alkylene sulphide product and can readily be ascertained by experiment.

The present process is advantageously carried out continuously by supplying the mercapto-alkanol, advantageously together with an entrainer as referred to above, to e.g. a jacketed vessel containing the acid dehydration catalystm aintained at the desired dehydration temperature and continuously removing therefrom alkylene sulphide-containing vapour for recovery of the alkylene sulphide by condensation in a low temperature zone maintained at an appropriate temperature. Advantageously the catalyst is supported on a massive support to provide a large surface area over which the mercapto-alkanol or a solution thereof in an entrainer can be trickled. Where by-product water contained in said vapour is also condensed in said zone this can be removed to waste by phase separation therein, but preferably all or at least the major proportion of such water is removed in a separate condensation zone preceding or following the alkylene sulphide condensation zone as appropriate.

The present invention will be further described and illustrated with reference to the following examples in which Example I is included for comparative purposes and the remaining examples refer to operation in accordance with the present invention:

EXAMPLE I (a) In view of the relative stability (as compared with ethylene sulphide) of 3-mercapto-propylene sulphide, attempts were made to prepare this compound by dehydration using either heat alone or a sulphuric acid catalyst. In the first case (Run I described in detail below) no 3-mercapto-propylene sulphide was obtained, whilst in the second case (Runs II–IV below) only very small yields of 3-mercapto-propylene sulphide were obtained suggesting that sulphuric acid is not a particularly suitable catalyst for this preparation. In all of these runs dehydration was carried out under much reduced pressure (10 mm. of mercury) in an effort to assist rapid removal, as vapour, from the reaction zone of the sulphide produced. The use of other common mineral acids, e.g. aqueous nitric acid and hydrochloric acid, will be found to have the same objection as sulphuric acid.

(b) An attempt was also made to produce ethylene sulphide by dehydration of 2-mercapto-ethanol using sulphuric acid as catalyst (Run V below): in this case a low pressure was again employed to assist removal of product vapour and the catalyst was in the form of sulphuric acid-impregnated pumice in an attempt to reduce the degree of contact between the catalyst and the evolved product vapour. No ethylene sulphide was obtained however, and it is considered this was due to the presence of sulphur oxides in the vapour phase away from the catalyst surface which caused the rapid conversion to polymer of any ethylene sulphide produced despite the precautions taken to minimise contact with the catalyst itself. Here again a similar objection will be found when using a nitric acid-impregnated pumice (through oxides of nitrogen) or a hydrochloric acid-impregnated pumice (through hydrogen chloride vapour).

Run I

In an unsuccessful attempt to dehydrate 2,3-dimercaptopropanol in the absence of added catalyst a flask equipped with a capillary gas leak was fitted with a vacuum-jacketed Vigreux fractionating column (15 cm. in length x 1 cm. diameter) carrying a reflux ratio stillhead incorporating a "cold finger" condenser. A standard water-cooled condenser was fitted between the stillhead and the receiver, and the apparatus was connected to a vacuum pump through a vapour trap cooled with solid carbon dioxide in acetone. 2,3-dimercaptopropanol (60 grams) was placed in the flask, the apparatus was evacuated to a pressure of 10 mm. of mercury and a stream of fine bubbles of nitrogen was allowed to pass through the dimercaptopropanol by way of the gas leak. The flask was heated in an oil-bath at 135° C., causing the dimercaptopropanol to reflux at 112–114° C. (stillhead temperature). The boiling-point of the liquid remained unchanged after one hour at total reflux, so the reflux ratio head was adjusted for distillation and only 2,3-dimercaptopropanol (54 grams) was recovered at the same stillhead temperature.

Run II

The dehydration of 2,3-dimercaptopropanol in the presence of a trace 1.2% w./w.) of sulphuric acid was attempted using the apparatus described in Run I. 2,3-dimercaptopropanol (25 grams) and sulphuric acid ($dl$ 84; 0.3 gram) were placed in the flask, the apparatus was evacuated to a pressure of 10 mm. of mercury and nitrogen was passed as before. The flask was warmed in an oil-bath to 120–130° C., whereupon rapid refluxing at a stillhead temperature of 62–63° C. ensued and the reflux head was immediately adjusted for distillation. The initial high rate of distillation soon decreased and the stillhead temperature dropped below 60° C., but collection of the volatile material was continued for about 1½ hours during which the stillhead temperature dropped to below 40° C. and the rate of distillation became so insignificant that at the end of this period heating was discontinued. The volatile liquid collected consisted of 3-mercaptopropylene sulphide $n_D^{20}$ 1.5813. The yield amounted to only 3.2 grams.

Run III

The dehydration procedure of Run II was repeated using a smaller amount (0.4% w./w.) of sulphuric acid. 2,3-dimercaptopropanol (25 g.) and sulphuric acid ($dl$ 84; 0.1 gram) were subjected to the process described in Run II above, and afforded thereby only 1.9 grams of 3-mercaptopropylene sulphide.

Run IV

The dehydration procedure of Run II was again repeated using a still smaller amount (0.04% w./w.) of sulphuric acid, 2,3-dimercaptopropanol (25 grams) and sulphuric acid ($dl$ 84; 0.01 gram) were subjected to the process described in Run II above. The rate of distillation of liquid boiling at 62–63° C. was very slow, and after 0.57 gram of 3-mercaptopropylene sulphide had been collected the rate of heating was increased and 10.4 g. of 2,3-dimercaptopropanol was recovered unchanged by rapid distillation at 112–114° C./10 mm. The involatile liquid residue weighed 12.0 g.

Run V

In an attempt to dehydrate 2-mercapto-ethanol using a sulphuric acid catalyst precautions were taken to remove any ethylene sulphide vapour from the catalyst as quickly as possible by supplying the catalyst in the form of sulphuric acid-impregnated pumice (the pumice being 4–8 mesh granules). The apparatus used comprised a vertical glass column 64 centimetres high and 2.6 centimetres in diameter equipped at the top with a three-way adaptor carrying a thermometer, a gas inlet and a pressure-equalising dropping funnel. The thermometer reached down into the column in which it was surrounded by catalyst. The column was heated by external electrical heating tapes and its lower end was connected to a train of three vapour traps, one of which was maintained at −70° C. Nitrogen suplied to the dropping funnel was used to sweep any ethylene sulphide reaction product from the column into the vapour traps. Using a catalyst consisting of sulphuric acid ($dl$ 84, 29 parts by weight) on pumice (71 parts by weight) and a catalyst temperature of 140° C.; and operating under reduced pressure (15 millimetres of mercury), no organic vapours were condensed.

EXAMPLE II

The dehydration of 2,3-dimercaptopropanol in the presence of potassium bisulphate in accordance with the present invention was carried out in a flask equipped with a capillary gas leak was fitted with a vacuum-jacketed Vigreux fractionating column (15 centimetres in length x 1 centimetre in diameter) and plain stillhead leading to the receiver through a water-cooled condenser. The apparatus was connected to a vacuum pump through a vapour trap cooled with solid carbon dioxide in acetone. Fused potassium bisulphate was finely crushed and the powder (30 grams) was added to freshly-distilled (B.P.

103–105° C. at 3 millimetres of mercury pressure) 2,3-dimercaptopropanol (30 grams) in the flask. The apparatus was evacuated to a pressure of 10 millimetres of mercury and a stream of fine bubbles of nitrogen was allowed to pass through the slurry by way of the gas leak. The flask was surrounded by an oil-bath, which was rapidly warmed to 120° C. Rapid distillation at a stillhead temperature of 54° C. began immediately. By careful adjustment of the oil-bath temperature within the range 120–140° C. the rate of heating was controlled so that the stillhead temperature did not rise above 62° C. The distillate collected during the first two hours came over at stillhead temperatures of 62–44° C. and weighed 14.49 grams. During the next four hours a further 3.22 grams of the oil distilled at stillhead temperatures of 44–29° C. followed during the final three hours by 0.11 gram of material at stillhead temperatures dropping to 22° C. The total weight of 3-mercaptopropylene sulphide $n_D^{20}$ 1.5813 obtained was 17.82 grams (69.5% of theory). Redistillation of the product through the same apparatus afforded 16.24 grams (63.3% of theory) of pure 3-mercaptopropylene sulphide (B.P. 62°/10 mm.; $n_D^{20}$ 1.5815).

EXAMPLE III (A) The dehydration of 2-mercapto-ethanol to ethylene sulphide in accordance with the present invention was carried out with the aid of potassium bisulphate as catalyst in the apparatus described in Example II with the omission of the vapour trap and vacuum pump connection. Fused potassium bisulphate was finely crushed and the powder (20 grams) was added to 2-mercaptoethanol (20 grams) in the flask. A stream of fine bubbles of nitrogen was passed through the slurry by way of the gas leak and the flask was heated in an oil-bath at 140° C. A mixture of water and a volatile oil passed over to the receiver at still head temperatures reaching 98° C. The distillate (4.75 grams) comprised ethylene sulphide and the amount of sulphide was estimated according to Braz (J. gen. Chem., Moscow, 1951, 21, 688) by adding methanol (10 millilitres) and a drop of diethylamine to the mixture, and weighing the polymer which had precipitated after two days. The weight of polymer found after drying was 1.86 grams, which indicated that the yield of ethylene sulphide was 12.1% of theory.

(B) The dehydration of 2-mercapto-ethanol to ethylene sulphide as described in section (A) of this example was repeated in a generally similar manner to that described except that the ethylene sulphide product was isolated and fully characterised as a solution in light petroleum.

The apparatus used comprised a 3-necked round-bottomed Pyrex-glass flask equipped with a plain, glass fractionating column (300 x 26 millimetres), a stirrer and a pressure-equalizing dropping funnel. The flask was supported in a bath of mineral oil and the fractionating column was surrounded by an electrical heating tape. The top of the column was fitted with two standard taper ground-glass sockets, one allowing admission of a thermometer to the column and the other the attachment of a plain stillhead carrying a second thermometer. The stillhead was connected through a water-colled condenser to a receiver, and the vapours emerging from this were led to a vapour trap cooled to −70° C. The receiver was loosely surrounded by solid carbon dioxide.

The internal temperature of the fractionating column was maintained at 100–110° C. a slow current of nitrogen was passed into the apparatus from an entrance at the top of the dropping funnel and sufficient 2-mercaptoethanol (39.2 grams; 35 millilitres) was added from the funnel to fused and finely-crushed potassium bisulphate (100 grams) in the flask which was maintained at 140° C. to make the mixture fluid and stirrable, followed gradually by the remainder (60.8 grams; 54.2 millilitres) over a period of 30 minutes. Heating and stirring were continued for a further hour, by which time all distillation had ceased.

A cloudy liquid distilling at 90–100° C. (28.7 grams) was collected in the receiver, where most of it solidified. This material was allowed to melt, but while some ice remained it was extracted with toluene (25 millilitres), the mixture was filtered, the two liquid phases in the filtrate were separated and the organic phase was dried over anhydrous magnesium sulphate. The aqueous phase weighed 18.8 grams (81.3% of theory). The toluene solution smelled strongly of ethylene sulphide and its infrared light absorption spectrum (sample thickness 0.1 millimetre) showed clearly the band at 943 cm.$^{-1}$ which is characteristic of ethylene sulphide (cf. Guthrie, Scott and Waddington, J. Amer. Chem. Soc., 1952, 74, 2795), together with a weak band at 2050 cm.$^{-1}$ also shown in the spectra of solutions of authentic material (Searles and Lutz, J. Amer. Chem. Soc., 1958, 80, 3168) in toluene. The strong band at 1050 cm.$^{-1}$ was obscured by strong solvent absorption in this region. The concentration of ethylene sulphide in the toluene solution was estimated to be 10% after comparison of the spectrum with the spectra of 10 and 15% solutions of authentic ethylene sulphide in toluene, so the total content of ethylene sulphide in this fraction was 2.8 grams.

The vapour trap contained a colourless oil (1.405 grams) with a very strong odour of ethylene sulphide. The oil was dissolved in light petroleum (B.P. 60–80° C.) to a total volume of 10 millilitres and dried over anhydrous magnesium sulphate (solution A). The infrared light absorption spectrum of this solution (sample thickness 0.1 millimetre) was identical with that of a 14% solution of authentic ethylene sulphide in the same solvent, and the strong bands at 1050 and 943 cm.$^{-1}$ characteristic of ethylene sulphide were clearly shown in the spectrum of the solution, together with a weak band at 2050 cm.$^{-1}$ also shown in the spectrum of the solution of authentic ethylene sulphide. An aliquot (0.5 millilitre) of solution A was dissolved in cyclohexane of spectroscopic quality (to 100 millilitres), and the ultraviolet absorption of the solution was compared with that of a solution of light petroleum (B.P. 60–80° C. 0.43 millilitre) in the same solvent (to 100 millilitres), using cells with a light path of 1 centimetre. Found: λ max. 261 m$\mu$, $\epsilon$ max. 35.6 ($\log_{10}$ I/I$_0$ at 261 m$\mu$: 0.416). R. E. Davis (J. Org. Chem., 1958, 23 216) quotes λ max. 216 m$\mu$, $\epsilon$ max. 34.3 for ethylene sulphide. The oil condensed in the vapour trap was shown to be ethylene sulphide, the total yield of which was therefore 4.2 grams or 5.4% of theory.

(C) The dehydration of 2-mercapto-ethanol to ethylene sulphide as generally described in section (A) of this example was repeated except that the 2-mercapto-ethanol was added gradually to molten potassium bisulphate in the reaction flask which was maintained at 200° C. Ethylene sulphide was condensed out in the cold trap at −70° C. as an oil, the yield of oil being 5.6% weight calculated on the 2-mercapto-ethanol.

(D) Isolation and recovery of the ethylene sulphide product produced in accordance with the runs A and B of this example is facilitated either by collecting the product in a cold trap containing a hydrocarbon solvent for the ethylene sulphide or by employing a low boiling hydrocarbon such as n-butane which is bubbled through the heated reaction mixture, which itself advantageously comprises a stirrable slurry of potassium bisulphate in a higher boiling hydrocarbon e.g. an aliphatic petroleum distillate boiling under dehydration conditions at above 170° C. to which the 2-mercapto-ethanol is continuously added, the low boiling hydrocarbon passing through the apparatus in the sulphide-containing vapour phase and condensing out with the ethylene sulphide in the cold trap.

I claim:

1. The process of producing ethylene sulphide by heating 2-mercapto-ethanol in a reaction zone with an alkali metal bisulphate selected from the group consisting of sodium bisulphate and potassium bisulphate, continuously removing the resulting ethylene sulphide product as formed from said reaction zone as a vapour phase and recovering said ethylene sulphide from said vapour base.

References Cited

UNITED STATES PATENTS 2,436,233   2/1948   Signaigo _____ 260—327

OTHER REFERENCES

Weissberger: Technique of Organic Chem.—Distillation, (vol. IV), Interscience Publishers, Inc., New York (1951), pp. 360, 363–366, 368–371.

Sabatier: Catalysis in Organic Chem., New York, Van Nostrand (1923), p. 246.

JAMES A. PATTEN, Primary Examiner